E. J. HAMER.
MOVABLE PRICE CARD HOLDER.
APPLICATION FILED DEC. 7, 1920.
1,409,100.
Patented Mar. 7, 1922.
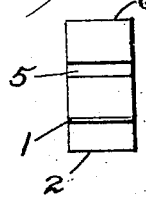
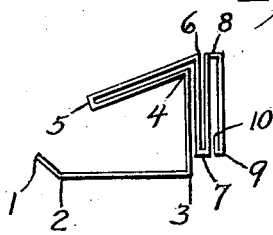
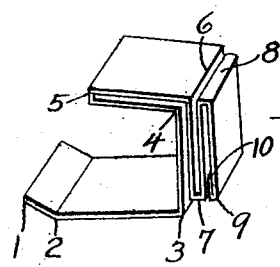
Inventor.
Ernest Joseph Hamer

UNITED STATES PATENT OFFICE.

ERNEST JOSEPH HAMER, OF LOS ANGELES, CALIFORNIA.

MOVABLE PRICE-CARD HOLDER.

1,409,100.

Specification of Letters Patent. Patented Mar. 7, 1922.

Application filed December 7, 1920. Serial No. 428,992.

*To all whom it may concern:*

Be it known that I, ERNEST JOSEPH HAMER, a citizen of the United States, residing at Los Angeles, in the county of Los Angeles and State of California, have invented a new and useful Movable Price-Card Holder, of which the following is a specification.

My object is to make a movable price card holder, and my invention consists of the novel features herein shown, described and claimed.

Figure 1 is an end elevation of a movable price card holder embodying the principles of my invention.

Fig. 2 is a perspective of the price card holder shown in Fig. 1.

Fig. 3 is a side elevation looking to the right in Fig. 1.

The price card holder is formed of a strip of resilient sheet metal, said strip being about an inch wide and several inches long and bent on the line 2 near one end to form the slightly upturned portion between the edge 1 and the line 2, preferably at an angle of 40° and about a quarter of an inch wide, and bent at right angles on the line 3 to form a horizontal portion between the lines 2 and 3 and bent at right angles on the line 4 to form a vertical portion between the lines 3 and 4, and reversely bent on the line 5 to form a portion between the lines 4 and 5 which is above the portion between the lines 2 and 3, and bent upon the line 6 to form a portion between the lines 5 and 6 above and spaced from the portion between the lines 4 and 5, and reversely bent upon the line 7 to form a portion between the lines 6 and 7 parallel with and spaced from the portion between the lines 3 and 4, and reversely bent upon the line 8 to form a portion between the lines 7 and 8 parallel with and spaced from the portion between the lines 6 and 7, and reversely bent upon itself on the line 9 to form a portion between the lines 8 and 9 parallel with and spaced from the portion between the lines 6 and 7 and to form the portion 10 which is the inturned edge of the end of the strip.

The distance from the line 2 to 3 is about an inch, from line 3 to line 4 about three-fourths of an inch, and the angle at the line 4 is about 70°. The distance from the line 5 to the line 6 is about three-fourths of an inch, and the distance from the line 6 to the line 7 about three-fourths of an inch, and the distances from the line 7 to the line 8 and from the line 8 to the line 9 is about three-fourths of an inch, and the portion 10 is about an eighth of an inch wide.

The holder is to be used on the edge of a shelf and the portions from the line 1 to the line 3 are to pass under the shelf, and the portions from the line 4 to the line 5 on top of the shelf and the resiliency of the material will grip the shelf. If the holder is placed upon the intermediate shelf, the price card for the upper shelf may be inserted into the pocket between the lines 6 and 8, and the price card for the lower shelf may be inserted into the pocket between the lines 7 and 9.

I claim:

1. A holder comprising a resilient strip bent to form a holding loop having one arm reversely bent upon said loop and formed as a loop extending in the opposite direction, the arm of said second loop being rearwardly extended and reversely bent upon itself to form an engaging finger, said reversely bent portion being then bent alongside said loops and extended rearwardly therefrom at the opposite end of said loops to form a second engaging finger.

2. A holder comprising a resilient strip bent to form a holding loop having one arm reversely bent upon said loop and formed as a loop extending in the opposite direction, the arm of said second loop being rearwardly extended and reversely bent upon itself to form an engaging finger, said reversely bent portion being then bent alongside said loops and extended rearwardly therefrom at the opposite end of said loops to form a second engaging finger, said second engaging finger being substantially at right angles to said loops with its end bent toward the first finger, and said first finger being inclined toward the second finger throughout its length.

3. A price card holder comprising a strip of resilient sheet metal having one end portion bent to form three substantially parallel legs that are spaced apart to form reversely arranged slots that are adapted to receive cards, the intermediate portion of said strip of metal being bent to form an inclined support, and the opposite end portion of said strip of metal being bent to form a support that is arranged substantially at right angles to the oppositely arranged card receiving slots.

4. A card holder comprising a strip of resilient sheet metal having one end portion bent to form three substantially parallel legs that are spaced apart to form oppositely arranged card receiving slots, and the remaining portion of the metal strip being bent to form members that project laterally from the leg forming portion of the strip and said laterally projecting portions forming base members for supporting the device in card-holding position.

ERNEST JOSEPH HAMER.